R. D. VERCLER.
TRACTION WHEEL.
APPLICATION FILED JULY 31, 1917.

1,263,630.

Patented Apr. 23, 1918.
2 SHEETS—SHEET 1.

WITNESSES

INVENTOR
Raymond D. Vercler,
BY
ATTORNEYS

R. D. VERCLER.
TRACTION WHEEL.
APPLICATION FILED JULY 31, 1917.
1,263,630.
Patented Apr. 23, 1918.
2 SHEETS—SHEET 2.
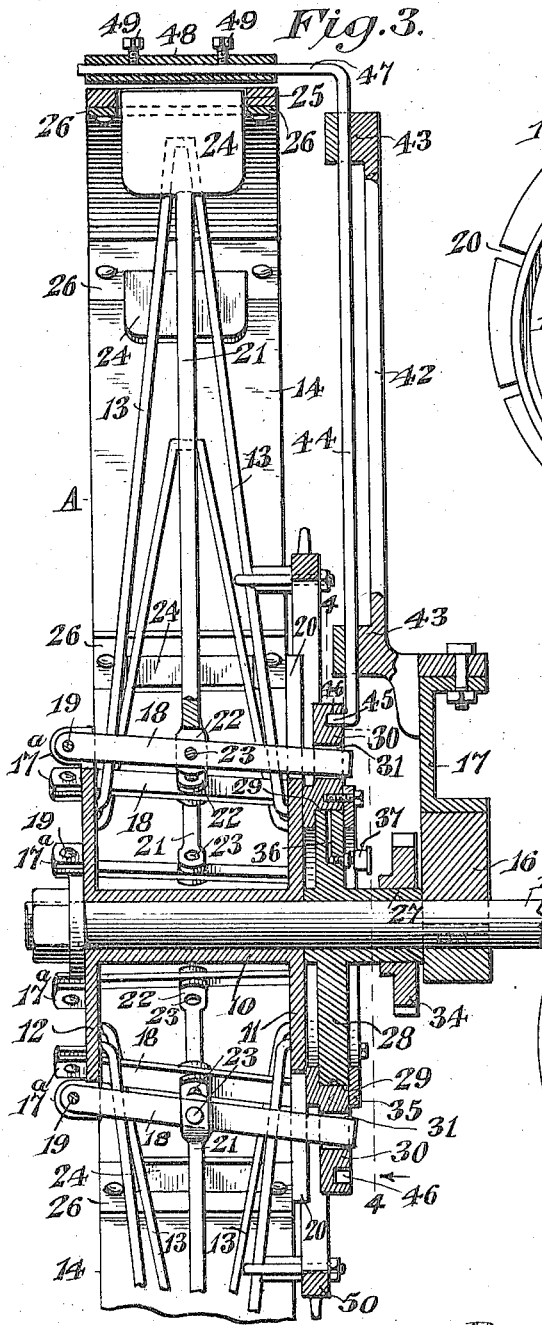
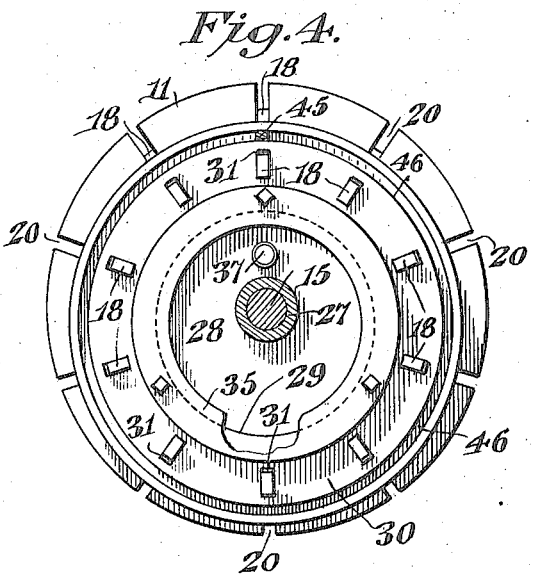
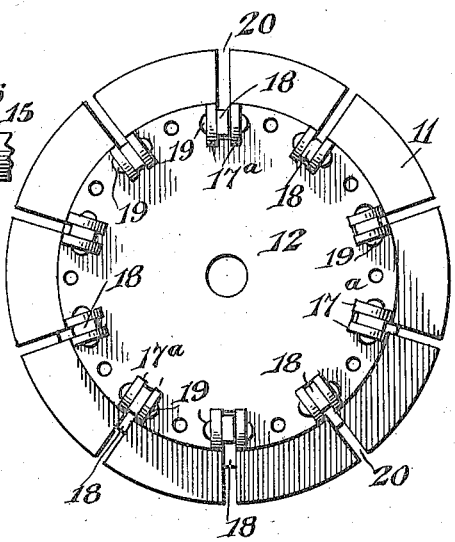
WITNESSES
INVENTOR
Raymond D. Vercler;
BY
ATTORNEYS

UNITED STATES PATENT OFFICE.

RAYMOND D. VERCLER, OF LOS ANGELES, CALIFORNIA, ASSIGNOR OF ONE-HALF TO CHARLES S. MANN, OF LOS ANGELES, CALIFORNIA.

TRACTION-WHEEL.

1,263,630.

Specification of Letters Patent.

Patented Apr. 23, 1918.

Application filed July 31, 1917. Serial No. 183,811.

*To all whom it may concern:*

Be it known that I, RAYMOND D. VERCLER, citizen of the United States, residing at Los Angeles, in the county of Los Angeles and State of California, have invented certain new and useful Improvements in Traction-Wheels, of which the following is a specification.

The invention relates to a traction wheel, and more particularly to anti-slipping traction wheels of traction engines, agricultural machines, motor driven vehicles, or the like.

The primary object of the invention is the provision of a wheel of this character, wherein cleats or spuds are arranged to be projected beyond the periphery thereof at its tread side to avoid slipping of the wheel on moist or marshy soil or slippery surfaces, thereby assuring maximum traction power when traveling thereover.

Another object of the invention is the provision of a wheel of this character wherein the tread surface of the same is cleared of all mud and foreign matter while said wheel is rotating and traveling upon a surface.

A further object of the invention is the provision of a machine of this character, wherein the wearing parts of the mechanism for automatically operating the cleats or spuds and the scraper are thoroughly lubricated to minimize friction, and also said parts are rendered dust proof, thereby increasing the life of the wheel.

A still further object of the invention is the provision of a wheel of this character which is comparatively simple in construction, positive, reliable and efficient in its operation, strong, durable and inexpensive in manufacture.

There are various other objects and advantages of this invention besides the above, and all of which will be hereinafter more fully or particularly brought out in the following specific description of the present preferred embodiment of the invention, the same being illustrated in the accompanying drawings, wherein:—

Fig. 3 is an enlarged fragmentary vertical transverse sectional view.

Fig. 4 is a sectional view on the line 4—4 of Fig. 3, looking in the direction of the arrow, with the distant parts of the wheel removed.

Fig. 5 is an outer end elevation of the hub with the distant part removed.

Similar reference characters indicate corresponding parts throughout the several views in the drawings.

Figure 1:
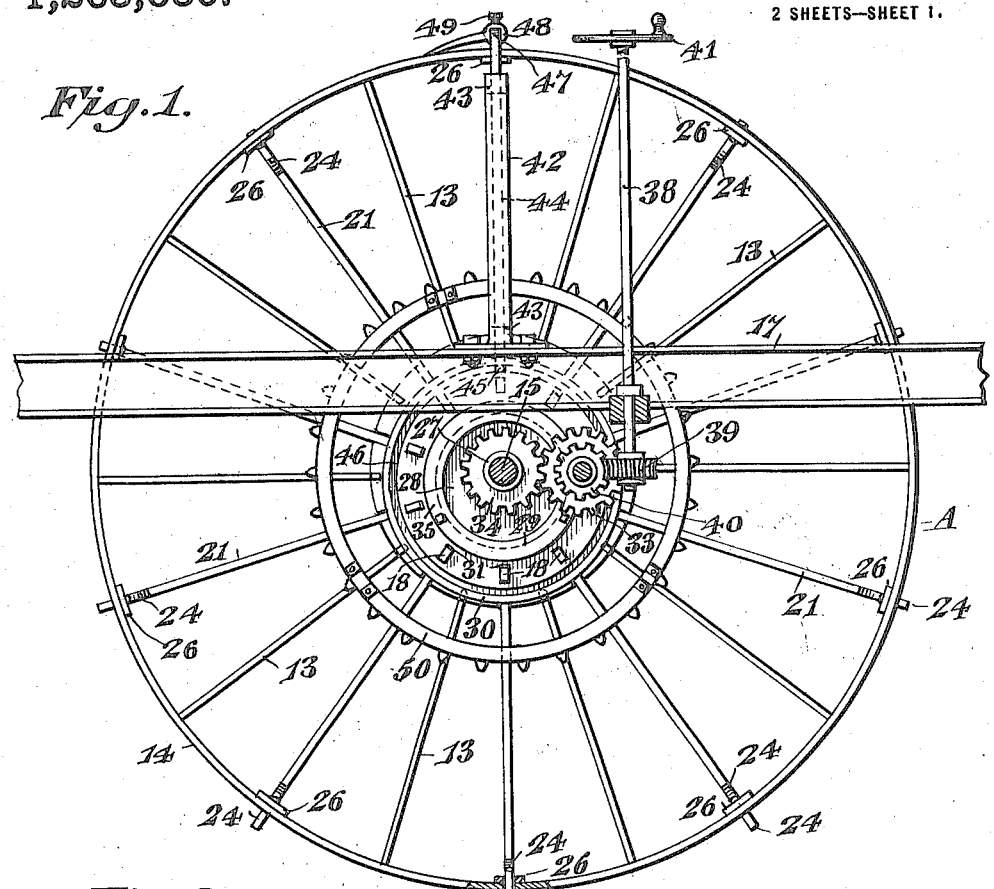
Figure 1 is an elevation of a wheel constructed in accordance with the invention, partly in section and looking toward the inner side thereof.
Figure 2:
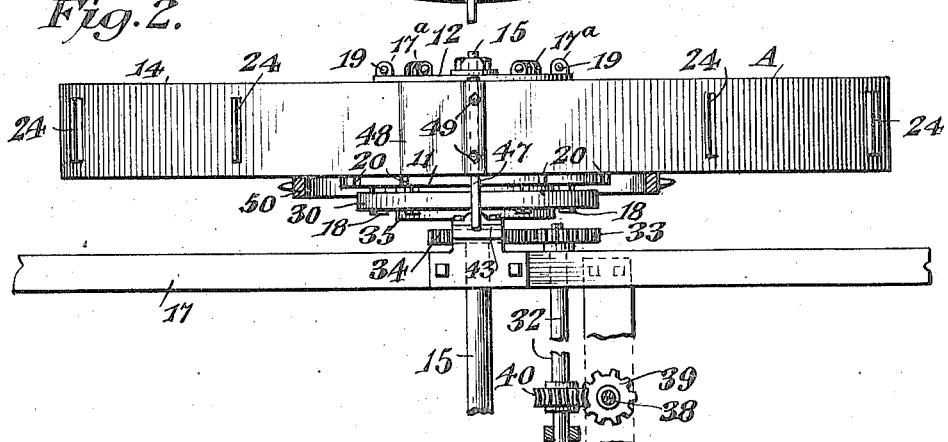
Fig. 2 is a top plan view.

In constructing a practical embodiment of the invention, in accordance with the illustrated example, the wheel A is provided, preferably comprising a hub 10 formed with inner and outer end disks 11 and 12, respectively, in which are fixed circumferentially thereof the inner ends of spokes 13 which, in this instance, are of the wire type having their outer ends fixed to the inner periphery of a tread rim 14, the hub 10 being journaled upon an axle 15 supported in a bearing 16 fixed to and depending from the side sill or beam 17 of the frame of the machine or the like. The outer disk 12 at its periphery is formed with a series of pairs of spaced ears 17$^a$, which project outwardly therefrom, the ears of each pair being located on opposite sides of radially disposed slots opening through the periphery of said disk, and pivoted between these ears 17$^a$ are swinging levers 18, the pivots 19 therefor being passed through the same and the ears 17$^a$, while the inner disk 11 of the hub is formed with radial guide slots 20 in which work the levers 18, the guide slots being extended through the periphery of the inner disk 11 to allow full movement of the levers for a purpose to be presently described.

Pivotally connected to the levers 18 intermediate their ends are plunger rods 21, the same being formed with inner bifurcated ends 22 receiving the levers 18 and through which are passed the pivots 23 connecting said rods 21 to the levers, while at the other ends of the rods 21 are formed cleats or spuds 24, which are slidably fitted in slots 25 formed in the tread rim 14'. Surrounding each slot at the inner periphery of the rim is a strengthening plate or reinforcement 26, the cleats or spuds 24 being adapted for movement to outwardly project beyond the outer periphery of the rim 14 of the wheel for a purpose to be presently described.

Mounted upon the axle 15, at the inner side of the hub 10 of the wheel for rotation thereon, is the sleeve 27 of an eccentric or cam 28 which fits within a counterseat 29 in an actuating ring or annulus 30 adapted to rotate with the wheel A, and is formed circumferentially thereof with radial slots 31 in which are loosely engaged the inner ends of the levers 18, so that on rotation of the wheel A corresponding movement is imparted to the ring or annulus 30 which revolves about the eccentric or cam 28 thereby actuating the levers 18 for imparting movement to the plunger rods 21, which shift the cleats or spuds 24 outwardly and inwardly at the rim 14 of the wheel. When the cam is in one position, the cleats or spuds 24 will be projected beyond the outer periphery of the rim 14 of the wheel at the tread side thereof, while at the uppermost or top side of the rim of said wheel the cleats or spuds 24 will have been retracted so as not to project beyond the outer periphery of the rim at the uppermost point of the wheel, the projected cleats or spuds 24 being designed to grip the soil at the tread side of the wheel (when projected) for preventing the slipping of the wheel, and thereby assuring maximum traction power on the travel of the same.

Suitably journaled at one side of the axle 15 is a shaft 32 which has fixed thereon at each end a pinion 33 which meshes with a gear 34, fixed to the sleeve 27 of the cam 28, and this shaft 32, on rotation thereof, imparts movement in unison to the eccentrics or cams 28 for both wheels at opposite sides of the machine, only one cam or eccentric 28 being shown, and proximate parts. The shaft 32, when rotated, causes the shifting of the eccentric or cam 28 to vary the action of the levers 18 for operating the cleats or spuds 24, so in lieu of having the same project beyond the outer periphery of the rim 14 at the tread side thereof, the said cleats or spuds 24 will project beyond the outer periphery of the rim at the top side of the wheel, thereby giving a smooth surface to the rim at the tread side when the wheel is traveling over a solid surface, and there is no possibility of the slipping of the same.

Detachably fastened on the ring or annulus 30 is a retaining ring 35 which slightly overlaps the eccentric or cam 28 to hold the same in the counterseat 29 in said ring or annulus 30 and also to exclude dust, dirt or other foreign matter from said counterseat and thereby avoiding wear or damage to the eccentric or cam 28 and ring or annulus 30, as will be obvious.

Formed in the eccentric or cam 28 is an oil duct or passage 36 which opens through the inner face and through the periphery of said eccentric or cam for delivering oil or lubricant to the counterseat 29 from an oil cup 37, which is tapped in the passage 36 at the inner face of the eccentric or cam, and in this manner the latter and the ring or annulus 30 will be thoroughly lubricated when the wheel is traveling upon a surface.

Suitably journaled in the frame of the machine at a convenient point is a vertical actuating staff 38, which has fixed thereto a worm screw 39 meshing with a worm gear 40 fixed to the shaft 32, the upper end of the staff 38 being provided with a hand wheel 41, so that it can be manually rotated and in this manner the eccentrics or cams 28 can be readily adjusted for varying the action of the cleats or spuds 24 of the traction wheel.

Mounted on the side sill or beam 17 of the frame of the machine is a vertically disposed bracket 42, formed with guide eyes 43 in which is non-rotatably and slidably mounted a scraper actuating arm 44, the inner end of which is formed with a nib or lug 45 engageable in an annular groove or channel 46 provided in one face of the ring or annulus 30 near the outer periphery thereof, while the outer end of the arm 44 is bent outwardly at right angles to form a hanger extension 47 on which is adjustably mounted a scraper blade 48, the same being fitted with set screws 49 for engagement with the extension 47 to permit the annular adjustment of the blade 48 relative to the outer periphery or tread surface of the rim 14 of the wheel. The blade 48 contacts with the tread surface of the rim 14, or the outer periphery of the wheel at the uppermost point thereof, when the cleats or spuds 24 have been retracted by the action of the eccentric or cam 28 on the ring or annulus 30, which also controls the movement of the arm 44 to clear the rim 14 of the wheel from mud or other foreign matter when the same is traveling upon a surface.

It will be apparent that the cleats or spuds 24 and the scraper blade 48 have positive movement by the action of the ring or annulus 30 controlled by the eccentric or cam 28 and thereby avoid the use of springs or other like tensioning devices ordinarily employed, so that the wheel will be more positive in action to obtain maximum traction power and maximum life thereto assured.

Carried at the inner side of the wheel A, concentrically of the hub 10 and fastened to the spokes 13 in the usual manner, is a power sprocket wheel or gear 50, which is driven from any suitable source of motive power for the driving of the wheel.

From the foregoing it is thought that the construction and manner of operation of the invention will be clearly understood and, therefore, a more extended explanation has been omitted.

What is claimed is:—

1. The combination with a traction wheel having a slotted hub, of levers working within the slotted hub and pivoted thereto, plunger rods connected with the levers, cleats or spuds on the plunger rods and movable through the periphery of the wheel, and an eccentrically movable annulus at the inner side of the hub and connected with the levers for actuating the same.

2. The combination with a traction wheel having a slotted hub, of levers working within the slotted hub and pivoted thereto, plunger rods connected with the levers, cleats or spuds on the plunger rods and movable through the periphery of the wheel, an eccentrically movable annulus at the inner side of the hub and connected with the levers for actuating the same, and means for eccentrically moving the annulus.

3. The combination with a traction wheel having a slotted hub, of levers working within the slotted hub and pivoted thereto, plunger rods connected with the levers, cleats or spuds on the plunger rods and movable through the periphery of the wheel, an eccentrically movable annulus at the inner side of the hub and connected with the levers for actuating the same, means for eccentrically moving the annulus, and scraper means controlled by the movement of the annulus for clearing the periphery of the wheel.

4. The combination with a traction wheel having a slotted hub, of transversely disposed levers pivoted at one end to the hub and working in the slots thereof, an eccentric mounted upon the axle contiguous to the inner side of the hub, an annulus about said eccentric and moved thereby and connected with the other ends of the levers, plunger rods connected to the levers at an intermediate point, cleats or spuds at the outer ends of the rods which are passed through slots of the tread or rim of the wheel, a scraper blade arranged across the periphery of the wheel, and an operating arm connected with the scraper blade and the annulus to cause the blade to contact with the periphery after the spuds or cleats have been retracted from the said periphery.

5. The combination with a traction wheel having a slotted hub, of levers working within the slotted hub and pivoted thereto, plunger rods connected with the levers, cleats or spuds on the plunger rods and movable through the periphery of the wheel, an eccentrically movable annulus at the inner side of the hub and connected with the levers for actuating the same, and an adjustable eccentric for controlling the movement of the annulus.

6. The combination with a traction wheel having a slotted hub, of levers working within the slotted hub and pivoted thereto, plunger rods connected with the levers, cleats or spuds on the plunger rods and movable through the periphery of the wheel, an eccentrically movable annulus at the inner side of the hub and connected with the levers for actuating the same, an adjustable eccentric for controlling the movement of the annulus, and means for adjusting the eccentric, a scraper mounted at the top of the wheel, and means connecting said scraper with the annulus to move the scraper into and out of contact with the periphery of said wheel.

7. The combination with a traction wheel having a slotted hub, of levers working within the slotted hub and pivoted thereto, plunger rods connected with the levers, cleats or spuds on the plunger rods and movable through the periphery of the wheel, an eccentrically movable annulus at the inner side of the hub and connected with the levers for actuating the same, an adjustable eccentric for controlling the movement of the annulus, means for adjusting the eccentric, said annulus being provided with a counterseat for the eccentric, and a retaining ring on the annulus for holding the eccentric in the counterseat and also constituting a dust guard.

8. The combination with a traction wheel having a slotted hub, of levers working within the slotted hub and pivoted thereto, plunger rods connected with the levers, cleats or spuds on the plunger rods and movable through the periphery of the wheel, an eccentrically movable annulus at the inner side of the hub and connected with the levers for actuating the same, an adjustable eccentric for controlling the movement of the annulus, means for adjusting the eccentric, said annulus being provided with a counterseat for the eccentric, a retaining ring on the annulus for holding the eccentric in the counterseat and also constituting a dust guard, and means for supplying lubricant to the counterseat through the eccentric.

9. The combination with a traction wheel having a hub provided with slotted end disks, spokes and a rim, of levers arranged circumferentially of the hub and movable in the slots in the disks thereof and pivoted to one of the same, plunger rods pivoted to the levers, cleats or spuds on the outer ends of the plunger rods and movable radially through the rim, an adjustable eccentric at the inner side of the hub, an annulus about said eccentric and moved thereby, said annulus being formed with slots receiving the levers for positive movement of the latter on the shifting of said annulus, and means for adjusting the eccentric.

10. The combination with a traction wheel having a hub provided with slotted end disks, spokes and a rim, of levers arranged circumferentially of the hub and movable in the slots in the disks thereof and pivoted to one of the same, plunger rods pivoted to the levers, cleats or spuds on the outer ends of the plunger rods and movable radially through the rim, an adjustable eccentric at the inner side of the hub, an annulus about said eccentric and moved thereby, said annulus being formed with slots receiving the levers for positive movement of the latter on the shifting of said annulus, means for adjusting the eccentric, a scraper blade arranged at the uppermost point of the rim, an actuating arm for the scraper blade to bring the same into and out of contact with the rim, said annulus being provided with an annular groove, a nib or lug on the arm and engageable in the groove, and a bracket for slidably supporting the arm.

11. The combination with a traction wheel having a hub provided with slotted end disks, spokes and a rim, of levers arranged circumferentially of the hub and movable in the slots in the disks thereof and pivoted to one of the same, plunger rods pivoted to the levers, cleats or spuds on the outer ends of the plunger rods and movable radially through the rim, an adjustable eccentric at the inner side of the hub, an annulus about said eccentric and moved thereby, said annulus being formed with slots receiving the levers for positive movement of the latter on the shifting of said annulus, means for adjusting the eccentric, a scraper blade arranged at the uppermost point of the rim, an actuating arm for the scraper blade to bring the same into and out of contact with the rim, said annulus being provided with an annular groove, a nib or lug on the arm and engageable in the groove, a bracket for slidably supporting the arm, the annulus being formed with a counterseat receiving the eccentric, and a retaining ring on the annulus for holding the eccentric in the counterseat in the annulus and excluding dust from said seat.

In testimony whereof I affix my signature in the presence of two witnesses.

RAYMOND D. VERCLER.

Witnesses.
 M. I. LAMPERT,
 L. McINTYRE.

Copies of this patent may be obtained for five cents each, by addressing the "Commissioner of Patents, Washington, D. C."